United States Patent [19]

Rauser

[11] Patent Number: 5,403,141
[45] Date of Patent: Apr. 4, 1995

[54] GRAIN SPREADER APPARATUS

[76] Inventor: Kenneth Rauser, 4814 Desoto, Lake Charles, La. 70605

[21] Appl. No.: 106,347

[22] Filed: Aug. 12, 1993

[51] Int. Cl.[6] .............................................. B65G 65/32
[52] U.S. Cl. ................................... 414/301; 414/299; 193/23; 239/687
[58] Field of Search ............... 414/293, 294, 295, 296, 414/299, 300, 301, 302; 193/3, 14, 23; 141/286; 239/681, 687, 688, 689

[56] References Cited

U.S. PATENT DOCUMENTS

| | | | |
|---|---|---|---|
| 797,073 | 8/1905 | Perry | 414/301 X |
| 1,068,006 | 7/1913 | Pottinger | 414/293 X |
| 1,726,603 | 9/1929 | Allen | 414/299 |
| 3,780,887 | 12/1973 | Bottoms | 414/299 |
| 3,902,610 | 9/1975 | Sukup | 214/17 |
| 3,966,124 | 6/1976 | Sukup | 239/666 |
| 4,040,529 | 8/1977 | Wurdemann et al. | 214/17 |
| 4,057,136 | 11/1977 | La Porte, Jr. | 193/3 |
| 4,216,914 | 8/1980 | O'Hanlon | 414/301 X |
| 4,342,532 | 8/1982 | Voegele | 414/299 |
| 4,433,707 | 2/1984 | Farnham | 414/301 X |
| 4,611,965 | 9/1986 | Dixon et al. | 414/299 |
| 4,754,869 | 7/1988 | Hutchison et al. | 414/301 X |
| 4,902,185 | 2/1990 | Dixon et al. | 414/301 |
| 5,020,701 | 6/1991 | Donelson | 222/494 |

*Primary Examiner*—David A. Bucci
*Assistant Examiner*—James Eller
*Attorney, Agent, or Firm*—Pravel, Hewitt, Kimball & Krieger

[57] ABSTRACT

A grain spreader apparatus for use with a silo that has a top and side walls includes a housing with an inlet portion for receiving grain to be stored in the silo and an exit portion communicating with a plurality of chutes. The spreader apparatus has a housing that includes a rotating and a non-rotating portion. The non-rotating portion is affixed to the top of the silo. A motor drive rotates the rotating portion of the housing about a vertical axis of rotation. The plurality of chutes include radially positioned chutes that are arranged along a common radial line, with each lower chute being of a smaller thickness than the previous chute. In this fashion, grain falling from the highest chute is divided into one portion that is received by the lower chute and another portion that falls freely to the floor of the silo. The plurality of chutes are arranged in differing distances from the axis of rotation so that grain falls to the floor of the silo in multiple concentric portions, providing for an even distribution of the grain on the silo floor.

15 Claims, 3 Drawing Sheets

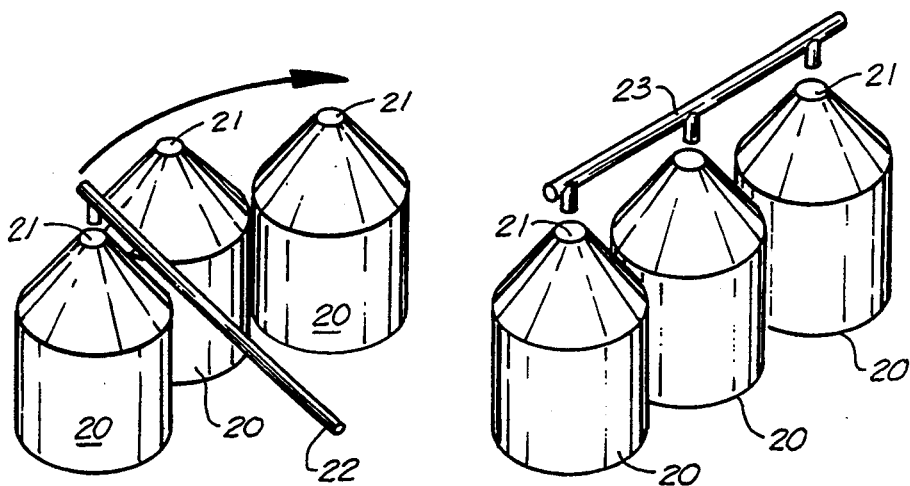
FIG. 4
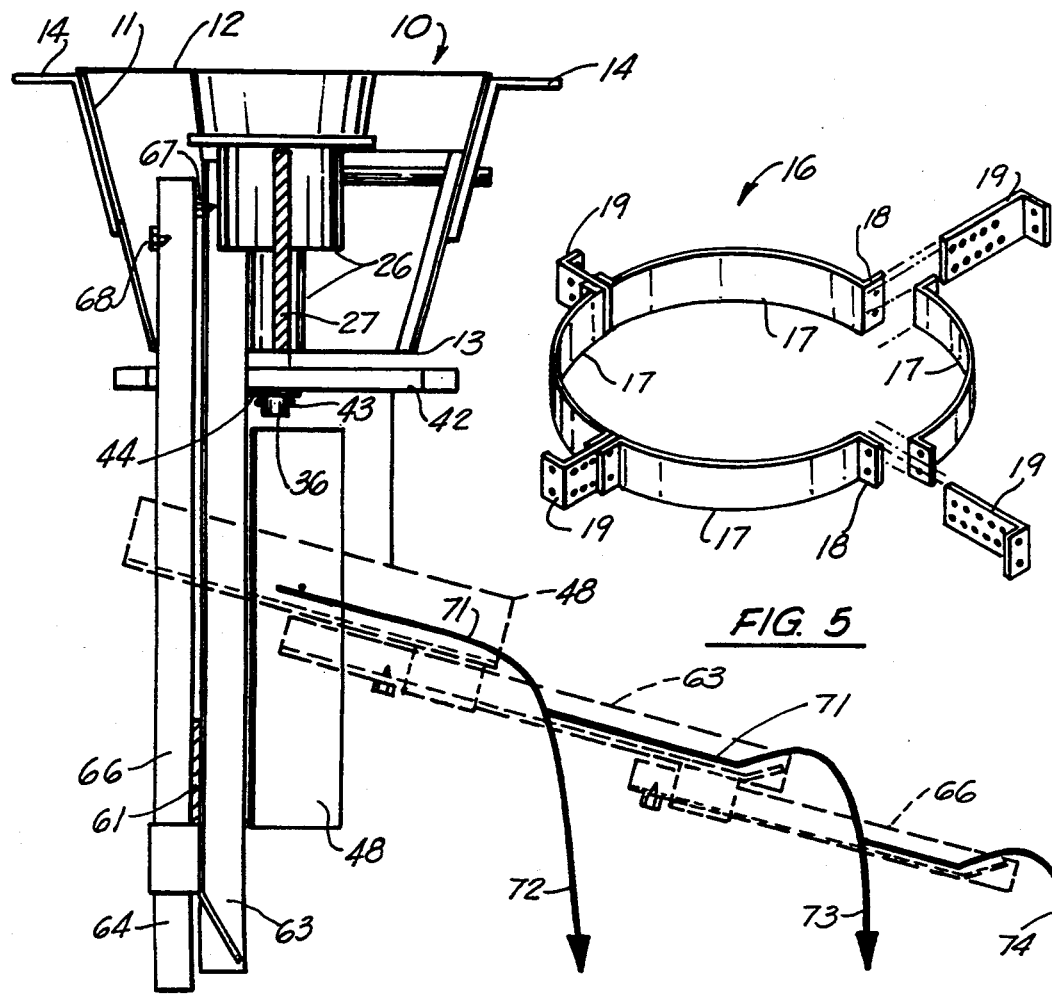
FIG. 5
FIG. 6

GRAIN SPREADER APPARATUS

BACKGROUND OF THE INVENTION

1. Field of the Invention

The present invention relates to grain spreaders for use with silos and more particularly relates to a grain spreader apparatus that is supported in the top of a silo and adapted to receive grain that is transmitted to the top of the silo from an external source. Even more particularly, the present invention relates to an improved grain spreader apparatus for use with silos wherein a housing includes a non-rotating and a rotating portion and wherein the plurality of chutes are supported for rotation with the rotating portion, each of the chutes being of a smaller transverse width starting with a larger width chute at the top and a smaller width chute at the bottom so that grain is discharged from one chute to the next by gravity and wherein a portion of the discharging grain falls to a lower chute and another portion of the grain falls freely to the silo floor.

2. General Background

Grain is stored in many different types of tanks, also known as silos or bins. One of the most popular is a vertically oriented cylindrical tank usually between twenty four and forty feet in diameter. The roof of such a tank is usually conical in shape, with a pitch of thirty to thirty five degrees (30°-35°). The roof is provided with an opening at the peak to provide for the intake of grain from a conveyor or conduit. This opening is typically part of a compression ring holding structural loads for the roof and other equipment and twenty to forty inches (20-40") in diameter for example.

Multiple tank arrangements are linear or circular in shape with overhead or inclined conveying devices used to load the material into the tanks. A single conveyor with one end anchored at the center point of several circularly oriented tanks is commonly used to load all the tanks in sequence.

Typically grain spreaders used to date are comprised of a gathering cone into which the flow of incoming grain is directed, located under the cone is some type of plate or trough which rotates to distribute the material about the center of the bin. Centrifugal type spreaders (eg. Domelson, U.S. Pat. No. 5,020,701 and Sukup, U.S. Pat. No. 3,966,124) distribute the grain by throwing it out from the center of the tank. They typically rotate one hundred to two hundred fifty RPM.

Trough type spreaders (Dixon, U.S. Pat. No. 4,902,185 and Wurdeman, U.S. Pat. No. 4,040,529) distribute the grain by means of troughs which extend from the center of the tank and typically rotate much slower (eg. 6 to 100 RPM).

Centrifugal type spreaders do not allow a homogeneous spread of material about the bin because the lighter material cannot be thrown as far as the heavier material. They tend to damage fragile grains from their aggressive rotation and because the individual grains impact the filled layer one at a time they tend to cause the fill to become closely packed.

Trough type spreaders tend to make a more homogeneous fill and the fill is lose if the grain is allowed to impact the filled layer in a stream rather than individual grains. They also do less damage to fragile grains because they rotate less aggressively.

Both types of spreaders are undependable at even distribution. The reason is the grain flow impacts the plate or trough at an angle to the vertical centerline. This angular flow is caused either by the conveying equipment not being perfectly centered or by the grain flowing to one side of the gathering cone. The momentum of the angular flowing grain forces more grain from the plate or trough at one point in its rotation. Likewise at an opposite point of rotation the grain tends to accumulate on the plate or trough. This causes an uneven distribution of material about the tank.

SUMMARY OF THE PRESENT INVENTION

The present invention provides an improved grain spreader apparatus for use with a silo that has a top and side walls and a conically shaped roof. The apparatus includes a housing having an inlet portion for receiving grain to be stored in the silo. The housing can be affixed by bolting for example to the top of the silo at an inlet opening. The housing is rotated using a motor drive. The motor drive rotates the housing about a generally vertical axis.

Multiple inclined chutes are suspended below the housing, each chute extending radially away from the vertical axis of rotation.

The plurality of chutes include a first uppermost chute having an inlet positioned adjacent the vertical axis and an outlet portion spaced away from the vertical axis. The outlet of the first chute extends transversely a first distance.

A second chute is supported under the first chute for receiving grain discharging from the first chute. The second chute provides an inlet that is transversely extending a distance smaller than the first transversely extending distance of the outlet of the first chute. Therefore, grain discharging from the first chute strikes the inlet portion of the second chute and also an area adjacent and externally of the second chute.

In the preferred embodiment, a third chute can be provided which is of a smaller transverse dimension than the second chute so that grain discharging from the second chute to the third chute partially registers upon the third chute, but also exits the second chute on first and second sides of the third chute. In this fashion, grain discharging from each of the chutes is divided into two portions, namely a first portion which is received by the smaller, lower and transversely thinner chute and a second portion that falls freely to the ground on the sides of the lower chute.

The plurality of chutes can be inclined by a measure of between vertical (zero degrees) to a position of within thirty degrees of horizontal.

In the preferred embodiment, the inlet portion includes a hopper having a vertically extending conduit portion.

In the preferred embodiment, the motor drive is mounted within the housing and defines a central vertical axis of the apparatus, namely an axis of rotation thereof.

In the preferred embodiment, the housing includes a fixed portion and a rotating portion.

In the preferred embodiment, the multiple chutes can be positioned at differing angles of inclination.

In the preferred embodiment, the housing includes a gathering hopper portion having a pyramidal frustrum shape with the larger open end at the top portion and a smaller diameter lower end portion, the hopper adapted to receive the flow of grain incoming from an external source such as a commercially available conveyor or conduit.

Mounting brackets are provided to secure the hopper over, within or under the center opening of the tank or silo or bin.

Within the hopper and below its top edge portion, a round flow breaking plate is provided which is generally horizontally oriented and centered within the hopper. The breaking plate is sized to allow grain to fall through the opening between the plate and the walls of the hopper after striking the plate.

A rotating vertical shaft is centered within the hopper upon bearings which are held in place for example by a weldment of a tube and radially oriented bars or brackets extending to the side walls of the hopper.

The apparatus includes a mounting ring assembly with adjustable brackets to allow the spreader apparatus of the present invention to be suspended in tanks having various center opening sizes at the top of the roof. The mounting ring consists of a plurality of semicircular plates such as for example four plates, each having bolting tabs for affixing the semicircular plates together and for the attachment of mounting brackets that bolt to the silo itself.

As the grain enters the cone it is directed to strike the deflection plate. The flow is directed horizontally by the plate to strike the walls of the cone and fall. This process distributes the flow about a major portion of the cone and also controls the velocity and angle at which the material will fall. When incoming material strikes the uppermost chute or trough, the set angle of the trough causes the grain to slide to and off the lower edge of the upper trough. A portion of incoming material falls into the narrower intermediate chute or trough. The balance of the incoming material falls to the tank floor and is distributed about a smaller radius as the unit turns. The volume of material at this first smaller radius can be controlled by the difference in width of the various troughs. The material may or may not be evenly distributed about the floor of the upper trough when it leaves the edge. The intermediate trough is centered underneath the first, upper trough to help evenly distribute the volume of material flow that is discharged from the first trough at the first radius. As the material flows down the intermediate trough, it increases velocity.

The intermediate trough can provide an inclined edge for controlling horizontal momentum if desired. This results in a more vertical fall of the material that bypasses the lowermost trough or chute.

Proportioning of the flow of incoming grain is controlled by the difference in width and in length of the various troughs to give a very even and controlled distribution of grain upon the floor of the silo.

As the unit turns, the cumulative angle of the grain exiting the cone and striking the upper trough may vary slightly at different positions. This will cause slightly larger volumes of incoming grain material to exit the troughs at varying positions. In order to minimize the unbalanced flow, the unit is turned at a very slow RPM. This allows the unbalanced points to be passed as few times as possible during the filling operation thus minimizing the total unbalancing of the grain fill.

In the preferred embodiment, the apparatus is turned at very slow rates using a reduction gear such as for example 0.30 RPMs. Thus, it is an object of the present invention to keep incoming grain material evenly and homogeneously distributed upon the floor of the silo.

Another object of the present invention is to keep the incoming grain loosely filled on the floor of the silo, to minimize tight packing of the grain.

Another object of the present invention is to create as little damage as possible to the incoming grain material. The present invention is a non-aggressive apparatus in its operation, operating at very low RPMs causing little or no damage to the incoming grain product.

It is an object of the present invention to maximize storage area in silos.

Another object of the present invention is to provide an apparatus that can be easily removed from its mounting position in a silo and moved manually from silo to silo or tank to tank.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 4 is a perspective schematic view illustrating use of the preferred embodiment of the apparatus of the present invention in loading convention grain silos with conventional conveying equipment;

FIG. 5 is a perspective fragmentary view of the preferred embodiment of the apparatus of the present invention illustrating the mounting ring portion thereof; and FIG. 6 is a side view of the preferred embodiment of the apparatus of the present invention showing operational and folded positions of the chutes.

DETAILED DESCRIPTION OF THE PREFERRED EMBODIMENT

Figure 1:
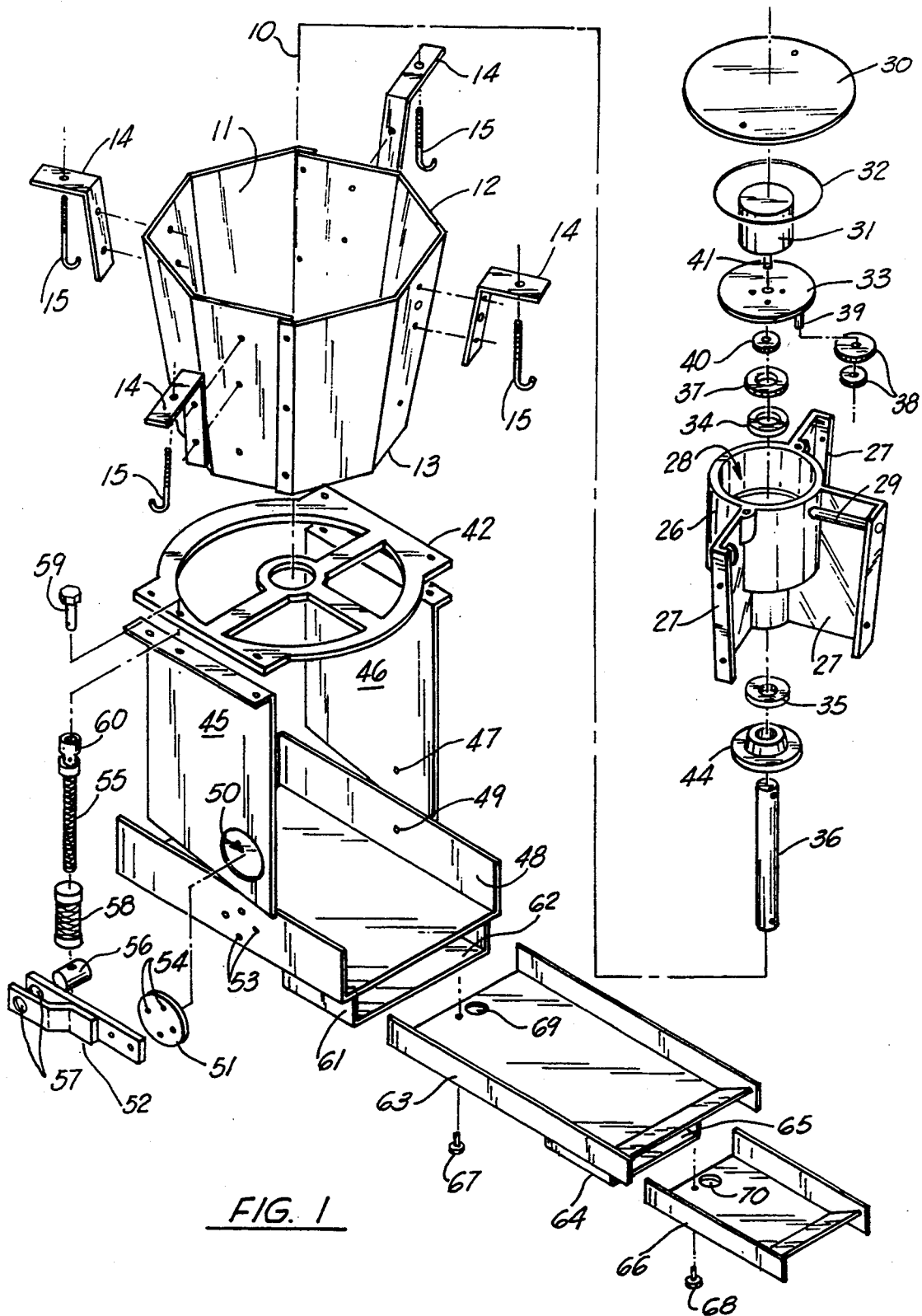
FIG. 1 is an exploded perspective view of the preferred embodiment of the apparatus of the present invention.
Figure 2:
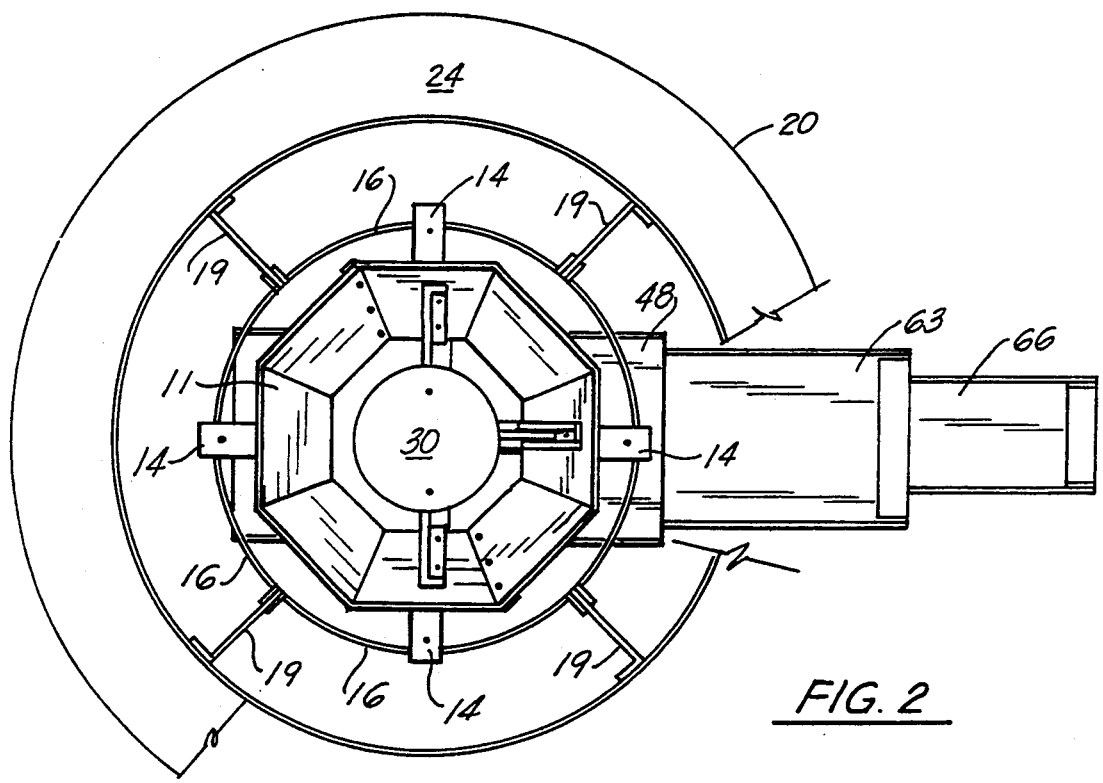
FIG. 2 is a top view of the preferred embodiment of the apparatus of the present invention.

FIGS. 1–6 illustrate the preferred embodiment of the apparatus of the present invention designated generally by the numeral 10.

Grain spreader apparatus 10 includes an uppermost housing portion that includes a cone 11. The cone 11 has an upper end 12 and a lower end 13. The housing also includes a plurality of brackets 14 for supporting the cone 11 in a position at the top opening 21 of silo 20 using a plurality of J-bolts 15. The brackets 14 attached to ring 16 which is bolted for example to the silo 20 during use. Each ring 16 is in the form of a plurality of curved plate segments 17. Each curved plate segment 17 includes tabbed end portions 18 that are bolted for example to mounting brackets 19. The mounting brackets 19 can be attached directly to silo 20 by bolting for example (see FIG. 3).

Figure 3:
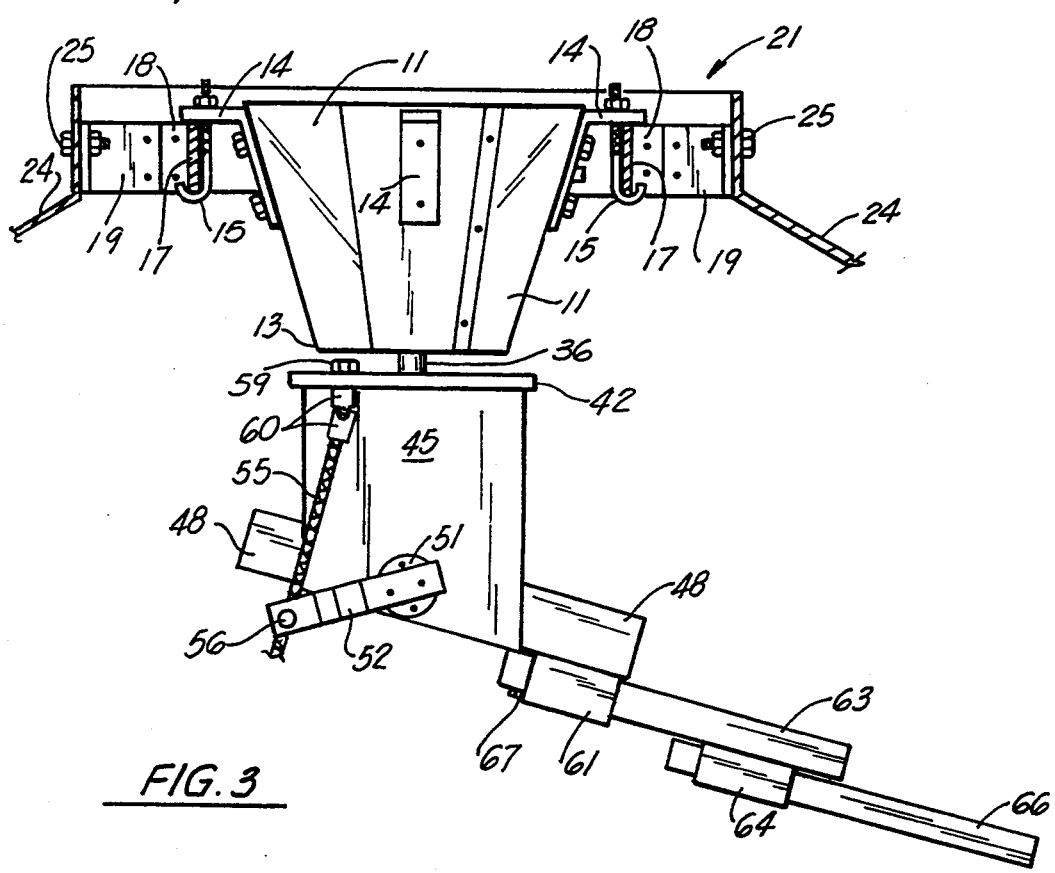
FIG. 3 is a side view of the preferred embodiment of the apparatus of the present invention.

In FIG. 4, the environment of the present invention is illustrated, showing a plurality of silos 20 each having a frustroconically shaped roof with a central circular opening 21. It should be understood that silos 20 having frustroconically shaped roofs and circular openings 21 are well known in the art. Also well known in the art is the use of conveyors 22, 23 to load a grain product into a silo 20 via an uppermost opening 21 as shown in FIG. 4. A single conveyor 22 can be used, moved from silo to silo as shown in FIG. 4 with the curved arrow. Alternately, a multiple dispensing conduit 23 can be used to convey grain products into silos 20. In FIG. 3, the conical section 24 of silo 20 is shown with the housing of the present invention being bolted thereto using bolted connections 25.

The apparatus 10 housing includes a motor housing 26 that is provided with a plurality of flanges 27 that are circumferentially spaced thereabout. Motor housing 26 also includes a bore 28 that is generally vertically oriented. Housing 28 also includes a conduit 29 for carrying electrical wiring that is used to power motor drive 31.

Motor drive 31 is housed within the vertical bore 28 of motor housing 26. Deflection plate 30 covers the top of open ended vertical bore 28 and an O-ring 32 forms a seal between deflection plate 30 and motor housing 26. Drive shaft 36 is supported within housing 26 and below motor drive 31 using upper and lower bearings 34, 35. Shaft 36 is rotated using shaft gear 37 and countershaft gears 38. Countershaft gears 38 are mounted upon offset shaft 39 that is carried by plate 33.

Primary gear 40 attaches to motor drive shaft 41 so that as motor drive 31 rotates shaft 41, gear 40 also rotates. Gear 40 engages one of the countershaft gears 38 which also drives a smaller countershaft gear that engages shaft gear 37.

It should be understood however that a set of reduction gears can be mounted below motor drive 31 and to drive shaft 41 to obtain a desired gear down ratio between the RPMs of the motor drive 31 and the speed of rotation of shaft 36 and thus support plate 42 which carries the plurality of troughs and chutes as will be described more fully hereinafter.

Support plate 42 is attached to and rotates with drive shaft 36. In FIG. 6, drive shaft 36 supports hub 44 that registers against the bottom of support plate 42. Hub 44 is held in position at the lower end of drive shaft 36 using a transverse pin 43 for example.

Support plate 42 carries a pair of spaced apart trough support plates 45, 46. The plate 46 provides an opening 47 for forming a pinned, pivotal connection with upper trough 48 at opening 49 on trough 48. The trough support plate 45 provides a larger opening 58 that receives circular plate 51 during use. Plate 51 is attached to trough 48 at the plurality of openings 53 and also to arm 52. Thus, during use the plate 51 can rotate within the opening 50, being rigidly attached to both trough 48 and arm 52. Arm 52 can be moved into different angular orientations with respect to a central vertical axis which is defined by the central longitudinal axis of shaft 36 during use (See FIG. 1).

Arm 52 includes a pair of spaced apart openings 57 for receiving nut 56. Nut 56 provides an internally threaded opening that receives the lower end portion of threaded rod 55. Threaded rod 55 can be covered with boot 58 to prevent debris from accumulating upon the threads of threaded rod 55. Support bolt 59 attaches to and is supported by plate 42 and defines a support for threaded rod 55. The interface between bolt 59 and threaded rod 55 can be for example a universal joint 60 so that rotation of universal joint 60 causes the threads upon rod 55 to engage the internal threads of nut 56. In this fashion, a rotation of universal joint 60 causes nut 56 to rise and or fall with respect to rod 55 thus raising and lowering the troughs 48, 63, 66 into differing angular orientations with respect to the vertical axis of apparatus 10. Each of the plurality of troughs 48, 63, 66 are of differing widths. Each trough is preferably rectangular, having a flat rectangular surface for receiving grains, and a pair of spaced apart side walls extending along the edge of the troughs as shown in FIG. 1. The first trough 48 defines an upper, largest width trough. The second trough 63 is an intermediate trough of intermediate width. The third trough 66 is the smallest of the three troughs and also defines a lowermost trough. The trough 48 includes a receiver bracket 61 having a horizontal slot 62. Slot 62 receives intermediate trough 63 as shown in FIGS. 1 and 6. The intermediate trough 63 fits into slot 62 which is of a smaller transverse width than the overall width of trough 48. Similarly, the trough 63 provides a receiver bracket 64 that is smaller in width than the width of intermediate trough 63. Thus, the receiver bracket 64 defines a horizontal slot 65 that is of a width smaller than the intermediate trough 63 and roughly the same width as the lower trough 66.

Set screws 67, 68 are used to affix the length and position of each of the lower troughs 63 and 66 into a desired position. The trough 63 can be adjustably moved within the slot 62 in a direction towards or away from the drive shaft 36.

Each of the troughs 63, 66 provides an opening 69, 70 respectively that can be gripped with a tool for removing or retracting a particular trough when the troughs 48, 63, 66 have been moved to a substantially vertical position (See FIG. 6). This allows the entire apparatus to be disassembled and removed from a particular silo 20 and transferred manually to another silo if desired. The set screws 67, 68 can be untightened and the troughs removed after rotating into the vertical position shown in FIG. 6. In FIG. 6, the arrows 71 denote the flow path of incoming grain. Some of the incoming grain falls from upper trough 48 to trough 63. However, note that arrow 72 shows the path for grain that falls to a side of the trough 63 and directly to the silo floor. Further, the arrow 73 denotes the flow of grain from intermediate trough 63 and to the sides of lower trough 66. The arrow 74 defines the flow of grain from intermediate trough 63 to lower trough 66 and to the silo floor after exiting the lowermost end portion of trough 66.

The following table lists the part numbers and part descriptions as used herein and in the drawings attached hereto.

| PARTS LIST | |
| --- | --- |
| Part Number | Description |
| 10 | apparatus |
| 11 | cone |
| 12 | upper end |
| 13 | lower end |
| 14 | brackets |
| 15 | J-bolts |
| 16 | ring |
| 17 | curved plate segment |
| 18 | tab |
| 19 | mounting bracket |
| 20 | silo |
| 21 | opening |
| 22 | conveyor |
| 23 | conveyor |
| 24 | conical section |
| 25 | bolted connection |
| 26 | motor housing |
| 27 | flanges |
| 28 | open ended vertical bore |
| 29 | conduit |
| 30 | deflection plate |
| 31 | motor drive |
| 32 | o-ring |

-continued
PARTS LIST

| Part Number | Description |
|---|---|
| 33 | plate |
| 34 | bearing |
| 35 | bearing |
| 36 | shaft |
| 37 | shaft gear |
| 38 | countershaft gears |
| 39 | shaft |
| 40 | primary gear |
| 41 | motor shaft |
| 42 | support plate |
| 43 | pin |
| 44 | hub |
| 45 | trough support plate |
| 46 | trough support plate |
| 47 | opening |
| 48 | trough, upper |
| 49 | opening |
| 50 | opening |
| 51 | circular plate |
| 52 | arm |
| 53 | openings |
| 54 | openings |
| 55 | threaded rod |
| 56 | nut |
| 57 | openings |
| 58 | boot |
| 59 | bolt |
| 60 | universal joint |
| 61 | receiver bracket |
| 62 | slot |
| 63 | trough, intermediate |
| 64 | receiver bracket |
| 65 | slot |
| 66 | trough, lower |
| 67 | set screw |
| 68 | set screw |
| 69 | opening |
| 70 | opening |
| 71 | arrow |
| 72 | arrow |
| 73 | arrow |
| 74 | arrow |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A grain spreader apparatus for use with a silo that has a top, floor, side walls, and an inlet opening in the top for receiving grain conveyed thereto, comprising:
   a) a housing having a housing inlet portion for receiving grain to be stored in the silo, a housing outlet, and a rotating portion;
   b) means for affixing the housing to the top of the silo;
   c) drive means for rotating at least the rotating portion of the housing about a vertical axis of rotation;
   d) the housing rotating portion supporting a plurality of inclined chutes for rotation therewith, each chute placed at a different elevation, each chute extending radially away from the vertical axis of rotation;
   e) the plurality of chutes including a first uppermost chute having an inlet positioned below the housing outlet and an outlet portion, the first chute extending transversely a first distance;
   f) a second chute supported at an elevation below the first chute so that the second chute receives at least some grain discharging from the first chute, the second chute having an inlet transversely extending a second distance that is smaller than the first distance so that grain discharging from the first chute strikes the inlet of the second chute and an open area on the side of and adjacent the second chute, allowing the grain that does not strike the second chute to free fall to the silo floor.

2. The grain spreader of claim 1 wherein the plurality of chutes include a third lowermost chute positioned under the second chute, and having an inlet portion with a transversely extending distance that is smaller than a transversely extending distance of the outlet portion of the second chute.

3. The grain spreader of claim 2 wherein one of the chutes is slidably connectable to another of the chutes.

4. The grain spreader apparatus of claim 1 further comprising means for adjustably inclining the chutes by a measure of between 0° and 60° with respect to the vertical axis of rotation.

5. The grain spreader apparatus of claim 1 wherein the inlet portion includes a hopper having a vertically extending conduit.

6. The grain spreader apparatus of claim 1 wherein the rotating means comprises a motor drive mounted on the housing.

7. The grain spreader apparatus of claim 1 wherein the housing has a fixed portion and a rotating portion.

8. The grain spreader apparatus of claim 1 wherein the plurality of chutes can be adjustably positioned into different angles of inclination.

9. The grain spreader apparatus of claim 1 wherein the housing comprises a fixed portion having a vertically extending hopper with upper and lower open end portions, and the plurality of chutes are supported below the lower open end portion of the hopper.

10. The grain spreader apparatus of claim 9 wherein the inlet portion of the uppermost chute is positioned under the lower open end portion of the hopper.

11. The grain spreader of claim 1 further comprising a deflection plate positioned within the housing generally between the housing inlet portion.

12. The grain spreader of claim 1 wherein the first and second chutes each have a central longitudinal axis that are vertically aligned so that the second chute is centered under the first chute.

13. The grain spreader of claim 1 wherein the plurality of chutes pivot about a transverse axis.

14. The grain spreader of claim 1 wherein the drive means is a motor device.

15. The grain spreader of claim 1 wherein one of the chutes is slidably connectable to another of the chutes.

* * * * *